US012526583B2

(12) United States Patent
Colloca et al.

(10) Patent No.: US 12,526,583 B2
(45) Date of Patent: Jan. 13, 2026

(54) TRANSDUCER AND PORTABLE AUDIO DEVICE COMPRISING SUCH A TRANSDUCER

(71) Applicant: Sonion Nederland B.V, Hoofddorp (NL)

(72) Inventors: Michele Colloca, Hoofddorp (NL); Gerardus Johannes Franciscus Theodorus Van Der Beek, Hoofddorp (NL); Camiel Eugene Groffen, Hoofddorp (NL); Jan Hijman, Hoofddorp (NL)

(73) Assignee: Sonion Nederland B.V., Hoofddorp (NL)

( * ) Notice: Subject to any disclaimer, the term of this patent is extended or adjusted under 35 U.S.C. 154(b) by 180 days.

(21) Appl. No.: 18/556,011

(22) PCT Filed: Apr. 19, 2022

(86) PCT No.: PCT/EP2022/060227
§ 371 (c)(1),
(2) Date: Oct. 18, 2023

(87) PCT Pub. No.: WO2022/223509
PCT Pub. Date: Oct. 27, 2022

(65) Prior Publication Data
US 2024/0223961 A1 Jul. 4, 2024

(30) Foreign Application Priority Data
Apr. 19, 2021 (NL) ...................................... 2028009

(51) Int. Cl.
*H04R 11/02* (2006.01)

(52) U.S. Cl.
CPC .................................. *H04R 11/02* (2013.01)

(58) Field of Classification Search
CPC .... H04R 11/02; H04R 1/1016; H04R 1/1075; H04R 1/25; H04R 1/456; H04R 9/04
See application file for complete search history.

(56) References Cited

U.S. PATENT DOCUMENTS

2008/0205691 A1 8/2008 Beekman et al.
2016/0044420 A1 2/2016 Albahri et al.
(Continued)

FOREIGN PATENT DOCUMENTS

DE 202020107255 U1 1/2021
EP 1962550 A2 8/2008
EP 1353531 B1 8/2011

OTHER PUBLICATIONS

International Search Report for International application No. PCT/EP2022/060227 dated Jul. 20, 2022.
(Continued)

*Primary Examiner* — Sunita Joshi
(74) *Attorney, Agent, or Firm* — Harness, Dickey & Pierce, P.L.C.

(57) ABSTRACT

The invention relates to a transducer comprising a housing, the housing at least partly accommodating: at least one moveable element; at least one drive means for moving the at least one moveable element, the at least one drive means comprising a coil and a magnet assembly, and at least one seal. The at least one moveable element comprises two legs that are connected to each other, where the coil extends around a first leg of the two legs, such that the first leg is driven in a reciprocating movement by the drive means and the second leg that is connected to the first leg is thereby also driven in the reciprocating movement, and wherein the at least one seal is attached to the second leg. The invention also relates to a portable audio device comprising such a transducer.

19 Claims, 4 Drawing Sheets

(56) References Cited

U.S. PATENT DOCUMENTS

| | | | | |
|---|---|---|---|---|
| 2016/0255433 | A1* | 9/2016 | Grinker ................ | H04R 1/1016<br>381/380 |
| 2021/0204065 | A1 | 7/2021 | Albahri et al. | |

OTHER PUBLICATIONS

International Preliminary Report on Patentability for International application No. PCT/EP2022/060227 dated Aug. 2, 2023.

* cited by examiner

TRANSDUCER AND PORTABLE AUDIO DEVICE COMPRISING SUCH A TRANSDUCER

CROSS-REFERENCE TO RELATED APPLICATIONS

This application is a national phase under 35 U.S.C. § 371 of PCT International Application No. PCT/EP2022/060227 which has an International filing date of Apr. 19, 2022, which claims priority to Netherlands Patent Application No. 2028009, filed Apr. 19, 2021, the entire contents of each of which are hereby incorporated by reference.

The invention relates to a transducer, for example for a portable audio device, for example a headphone or an in-ear device, such as a hearing aid, hearing device, hearable, earphone, earbud and the like, the transducer comprising a housing, the housing at least partly accommodating:

at least one moveable element;

at least one drive means for moving the at least one moveable element, the at least one drive means comprising a coil and a magnet assembly, and at least one seal attached to an inner side of a circumferential wall of the housing for dividing an inner volume of the housing in at least two chambers that are sealed off with respect to each other by means of the at least one seal.

Such a transducer is known per se. For example EP1962550 discloses such a transducer wherein a front chamber of the two chambers is equipped with a magnet and the other, back chamber, is equipped with another magnet and a coil. An armature that is moved by the drive means extends through the coil and the magnet gap and a diaphragm that is linked to the armature and moved therewith extends through the magnet gap only. The transducer of EP1962550 comprises both a diaphragm and an armature requiring the receiver to be relatively thick.

It is an object of the invention to improve the known transducer. More in particular, it may be an object of the invention to provide a transducer which has a relatively small size and/or relatively large output with respect to the size, in particular in a lower frequency range and/or may be easy and/or faster to manufacture.

This object is met by a transducer according to the preamble, wherein in accordance with the invention the at least one moveable element is arranged for outputting acoustic energy and comprises a first leg and a second leg that are connected to each other, wherein the coil extends around the first leg, such that the first leg is driven in a reciprocating movement by the drive means and the second leg, that is connected to the first leg, is thereby also driven in the reciprocating movement, and wherein the at least one seal is attached to the second leg.

An advantage of the at least one moveable element being arranged for outputting acoustic energy is that no diaphragm is required, which may reduce the size of the transducer. An advantage of the moveable element comprising the two interconnected legs is that the first leg may be the leg that is driven in the reciprocating or vibrating movement by means of the coil extending around the leg, such that the second leg is not surrounded by a coil, and it is possible to attach the seal thereto. Because the seal may be attached to the second leg, no additional element is required for supporting the seal and/or the size of the transducer and in particular of the housing thereof may be relatively small.

The at least two chambers may be defined as a back chamber and a front chamber, which are sealed off with respect to each other by means of the seal.

The two legs may extend substantially parallel to each other, i.e., the longitudinal directions of the two legs may be substantially parallel.

The at least one seal may comprise a plastic material, such as a polymer, e.g., Polyurethane, or alternatively a metal material such as aluminium, nickel, stainless steel, or any other similar material. It should however be understood, that the at least one seal may comprise a plurality of materials.

The at least one seal may be formed by a sheet material; i.e. by a thin, flat piece of the required material to thereby form a first outer surface and an opposite second outer surface. The at least one seal may form a circumferential edge along an outer periphery thereby forming a circumferential edge of the first and the second outer surfaces.

The at least one seal may in particular be attached to the inner side of the circumferential wall of the housing with a circumference thereof, in particular the full circumference thereof. Thus, the at least one seal may be attached to the inner side of the circumferential wall of the housing along the circumferential edge of the seal.

The at least one seal may in particular be attached to the second leg with at least part of a main plain thereof.

The cross-sectional shape of the circumferential wall of the housing and/or the shape of the circumference of the at least one seal are preferably substantially the same and/or may be any suitable shape. Practically this shape may be substantially rectangular. It should be understood, that the edges and corners of the rectangular shape may be rounded off.

In an embodiment of the transducer according to the invention, the at least one seal is attached to a side of the second leg that is facing away from the first leg. The at least one seal may be attached to the second leg along a part of the first outer surface or the second outer surface of the seal.

In such an embodiment the moveable element and the coil for driving the moveable element are located in a first chamber of the at least two chambers. The first chamber in which the moveable element and coil are located may be the back chamber.

The coil may comprise a number of windings defining a coil tunnel through which the first leg of the moveable element extends.

The side may alternatively be referred to as a surface of the second leg that is facing away from the first leg.

The side may in particular be the side or surface of the second leg that is facing or directed towards a second chamber, i.e., the front chamber.

In an embodiment of the transducer according to the invention the at least one seal is attached to the second leg by gluing.

Any suitable glue may be provided for this purpose, such as for example one or two component epoxy glues. Alternatively, silicone oil or pressure sensitive tape may be suitable. The glue is preferably flexible and/or comprises a relatively large temperature range and/or has a curing temperature below the deformation temperature of the seal.

In an embodiment of the transducer according to the invention, the at least one seal comprises a flexible and/or stretchable foil.

An advantage thereof is that the seal may be moved together with the moveable element.

In an embodiment of the transducer according to the invention, the at least one moveable element has a substantially U-shaped cross section and the first leg and the second leg are connected to each other by a base of the U-shape.

The at least one moveable element may in particular be substantially U-shaped as seen in a longitudinal cross section through the two legs of the moveable element, i.e., orthogonal to a main plane of the seal and parallel to the longitudinal direction of the legs.

The at least one moveable element may be made from any type of material able to guide or carry a magnetic flux. The armature may be electrically conducting or not.

In an embodiment of the transducer according to the invention the at least one coil is completely arranged in a first chamber of the at least two chambers. This first chamber may in particular be the back chamber as described above.

In an embodiment of the transducer according to the invention the magnet assembly comprises two magnets, wherein a first magnet is arranged in a first chamber of the at least two chambers and a second magnet is arranged in a second chamber.

The first chamber may be the back chamber and the second chamber may be the front chamber as described above.

In an embodiment of the transducer according to the invention the transducer comprises two of the moveable elements, two of the drive means and two of the seals, wherein the two moveable elements are arranged substantially parallel to each other and the first legs thereof are neighbouring legs, and wherein the two seals are attached to respective second legs in such a manner that the housing is divided by the seals in substantially three chambers, wherein the two moveable elements and the coils are arranged in a middle chamber of the three chambers.

This has the advantage of having double the output of a single moveable element. Alternatively, or additionally, the vibrations perpendicular to the plane of the moveable element are cancelled out.

The middle chamber may be the back chamber and the two outer chambers may be front chambers. Alternatively formulated, the middle chamber may be the first chamber and the two outer chambers may be second chambers.

The seals may in particular be attached to the respective outer sides or surfaces of the second legs, outer being defined with respect to the other moveable element.

In an embodiment of the transducer according to the invention the transducer comprises two of the moveable elements, two of the drive means and two of the seals, wherein the two moveable elements are arranged substantially parallel to each other and the first legs thereof are the outer legs, and wherein the two seals are attached to respective second legs in such a manner that the housing is divided by the seals in substantially three chambers, wherein the two moveable elements and the coils are arranged in a respective outer chamber of the three chambers.

This has the advantage of having double the output of a single moveable element. Alternatively, or additionally, the vibrations perpendicular to the plane of the moveable element are cancelled out.

In this embodiment the middle chamber may be the front chamber and the two outer chambers may be back chambers. Alternatively formulated, the middle chamber may be the second chamber and the two outer chambers may be first chambers.

In each outer chamber a respective moveable element and coil are arranged.

The seals may in particular be attached to the respective inner sides or surfaces of the second legs, inner being defined with respect to the other moveable element.

As explained above, in this embodiment the first legs are the outer legs, wherein outer is defined with respect to the other moveable element.

The at least one moveable element may in particular be a so-called armature.

Because it is the armature that outputs the acoustic energy no separate membrane needs to be provided. An advantage thereof is that the size of the transducer and in particular of the housing thereof may be relatively small.

In an embodiment of the transducer according to the invention, the at least one seal is attached to the inner side of the circumferential wall of the housing by means of a frame.

The frame provides the advantage of holding the circumference edge of the seal.

The frame may in particular be a frame that extends along the circumference of the inner side of the wall.

A plurality of the frames may be provided, wherein the number of frames is preferably equal to the number of seals and each seal is attached to the inner side of the circumferential wall by a respective frame.

The housing may comprise at least one sound outlet opening that connects to the front chamber or to a respective front chamber.

The invention further relates to a portable audio device, for example a headphone or an in-ear device, such as a hearing aid, hearing device, hearable, earphone, earbud and the like, the portable audio device comprising a transducer as described above with respect to any one or more of the described embodiments and/or having any one or more of the features described with respect thereto, alone or in any suitable combination.

The invention will be further elucidated with reference to figures, wherein.

In the figures same features are referred to by same reference numerals.

Figure 1:
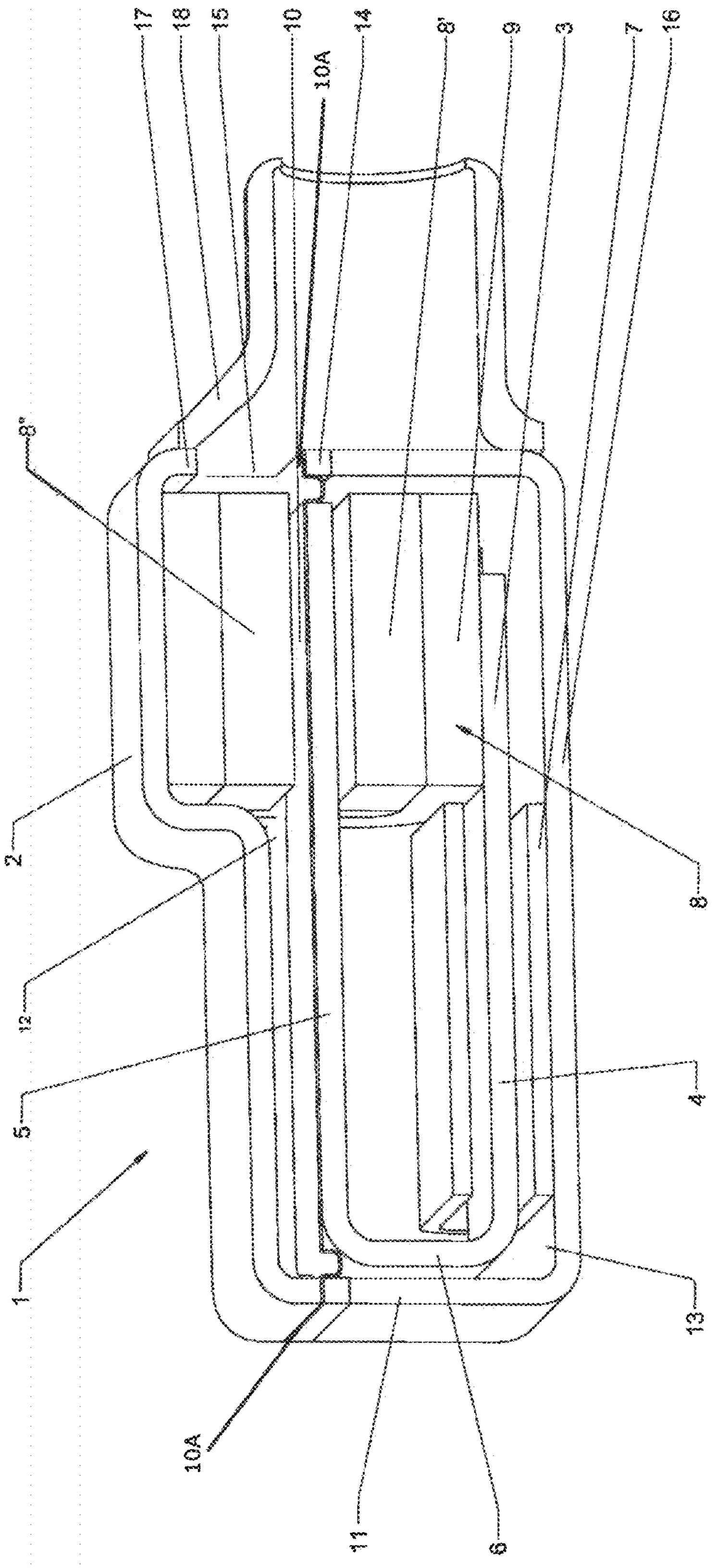
FIG. 1 shows a schematic perspective cross section of the transducer according to a first embodiment of the invention.

FIG. 1 shows a transducer 1 according to a first embodiment of the invention. The transducer 1 may be suitable for and/or arranged to be part of a portable audio device, for example a headphone or an in-ear device, such as a hearing aid, hearing device, hearable, earphone, earbud and the like. The transducer 1 comprises a housing 2. In this embodiment the housing 2 accommodates one moveable element 3 that in this embodiment is a so-called armature. The moveable element 3 is arranged for outputting acoustic energy, i.e., sound. In this embodiment the moveable element 3 is substantially U-shaped and comprises two legs 4, 5, which legs 4, 5 are connected to each other by means of the base 6 of the U-shape. The legs 4, 5 extend substantially parallel to each other in the longitudinal directions thereof. A drive means 7, 8 is provided for moving the moveable element 3. The drive means 7, 8 comprises a coil 7 and a magnet assembly 8, the magnet assembly 8 comprising two magnets 8' and 8". In this embodiment a magnet shell 9 is provided for mechanically supporting and/or holding and/or covering the magnets 8', 8". Further, the magnet shell 9 is carrying the return of the magnetic flux. In accordance with the invention the coil 7 extends around first leg 4 of the legs 4, 5, such that no coil extends around the second leg 5. The drive means 7, 8 is arranged for driving the first leg 4 and thereby also the second leg 5 that is connected to the first leg 4 in a reciprocating or vibrating manner by feeding an alternating current to the coil 7, as is well known to the skilled person. As a result of the reciprocating or vibrating movement of the moveable element 3 the moveable element 3 outputs the acoustic energy. The housing 2 further accommodates a seal 10 that along its circumferential edge 10A is attached to an inner side of a circumferential wall 11 of the housing 2 for dividing an inner volume of the housing 2 in two chambers 12, 13 that are sealed off with respect to each other by means of the at least one seal 10. The chamber 12 is a so-called front chamber and the chamber 13 is a so-called back chamber. The seal 10 is further attached to the second leg 5, in particular to a surface or side of the second leg 5 that is facing the front chamber 12 and/or is facing away from the first leg 4. The seal 10 is in this embodiment attached to the second leg 5 by means of gluing. The seal 10 is in this embodiment attached to the circumferential wall 11 by means of a circumferential frame 14 along its circumferential edge 10A. The seal 10 may in particular be a flexible and/or resilient foil, for example a PU foil. As is clear from FIG. 1, the moveable element 3 and the coil 7 are located in the back chamber 13. The housing 2 further comprises a sound outlet opening 15 that connects to the front chamber 12. In this embodiment the housing 2 comprises two parts, i.e., a casing 16 and a cover 17. A spout 18 connects to the housing 2 in such a manner that the sound that leaves the transducer 1 via the sound outlet opening 15 enters the spout 18, i.e., the sound outlet opening 15 opens into the spout 18.

Figure 2:
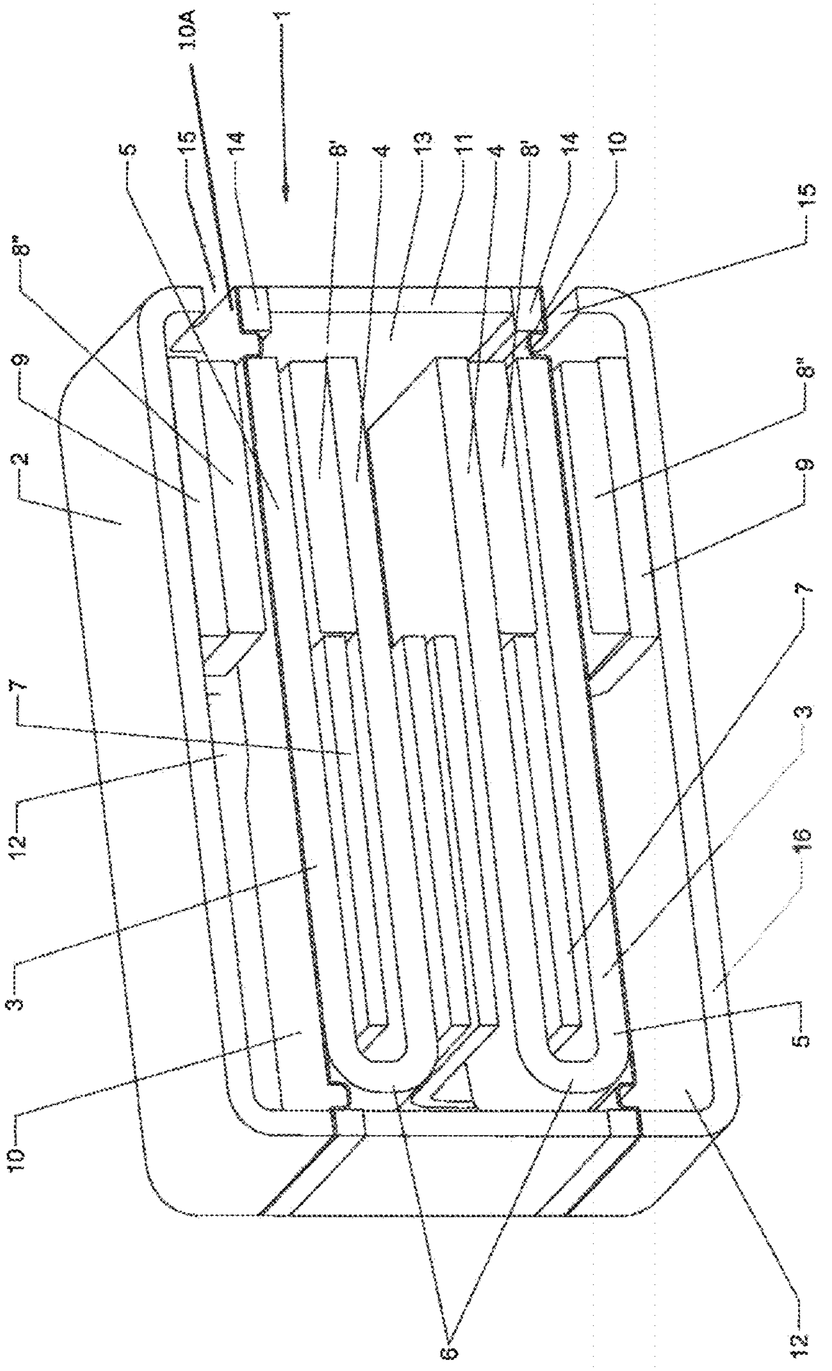
FIG. 2 shows a schematic perspective cross section of the transducer according to a second embodiment of the invention.

FIG. 2 shows the transducer 1 according to a second embodiment of the invention. Only the differences from the first embodiment will be explained here. For a further description of the transducer 1 of FIG. 2 the reader is referred to the description relating to FIG. 1.

The transducer 1 of FIG. 2 differs from the first embodiment in that the transducer 1 comprises two moveable elements 3, two sets of drive means 7, 8 and two seals 10. The two moveable elements 3 are arranged substantially parallel to each other and the first legs 4 thereof are neighbouring legs. The two seals 10 are attached to the respective second legs 5 in such a manner that the housing 2 is divided by the seals 10 in substantially three chambers 12, 13, 12, wherein the two moveable elements 3, the coils 7 and magnets 8' are arranged in a middle chamber 13 of the three chambers 12, 13, 12. The other magnets 8" are arranged in the outer chambers 12. The chambers 12 are the front chambers, wherein each front chamber 12 connects to a respective sound outlet opening 15 provided in the circumferential wall 11 of the housing 2, and the chamber 13 is the back chamber. The seals 10 are attached to the second legs 5 in such a manner that these are facing the front chambers 12 and/or are facing away from the first legs 4. The seals 10 are attached to the circumferential wall 11 along their circumferential edge 10A by means of respective circumferential frames 14. The advantage of such a dual design comprising two of the moveable elements 3 is that the vibration in direction perpendicular to the armature plane is cancelled and that the output is doubled with respect to a transducer comprising a single moveable element.

Figure 3:
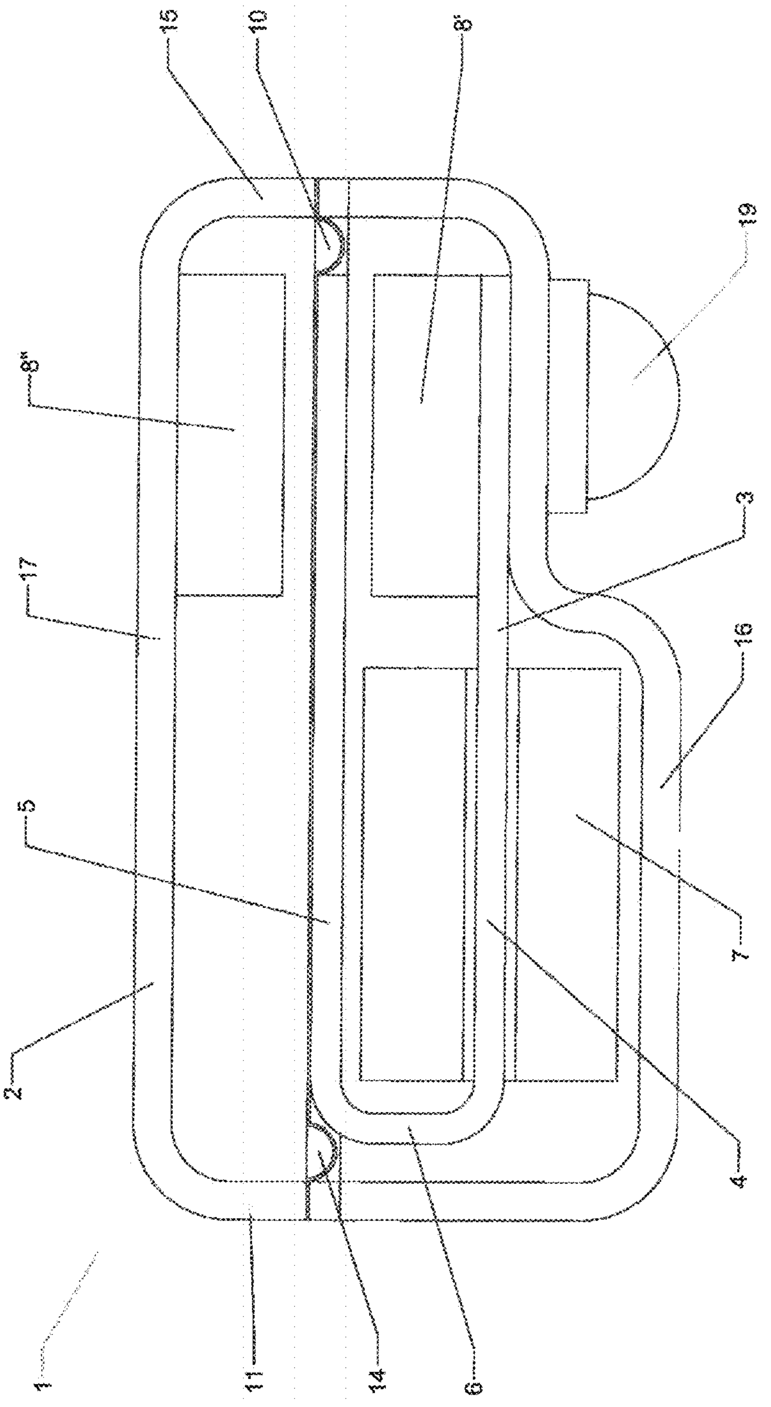
FIG. 3 shows a schematic cross sectional side view of the transducer according to a third embodiment of the invention.

FIG. 3 shows the transducer 1 according to a third embodiment of the invention. Only the differences from the first embodiment will be explained here. For a further description of the transducer 1 of FIG. 3 the reader is referred to the description relating to FIG. 1.

The transducer 1 of the third embodiment of FIG. 3 differs from the transducer 1 of FIG. 1 in that no separate magnet shell 9 is provided, but that the housing 2, and in particular the casing 16 and cover 17 thereof function as a magnet shell. In FIG. 3 further a solder pad 19 is shown that provides the electrical connection. The first and second embodiments of FIGS. 1 and 2 may also comprise such a solder pad 19 but these are not shown in FIGS. 1 and 2.

Figure 4:
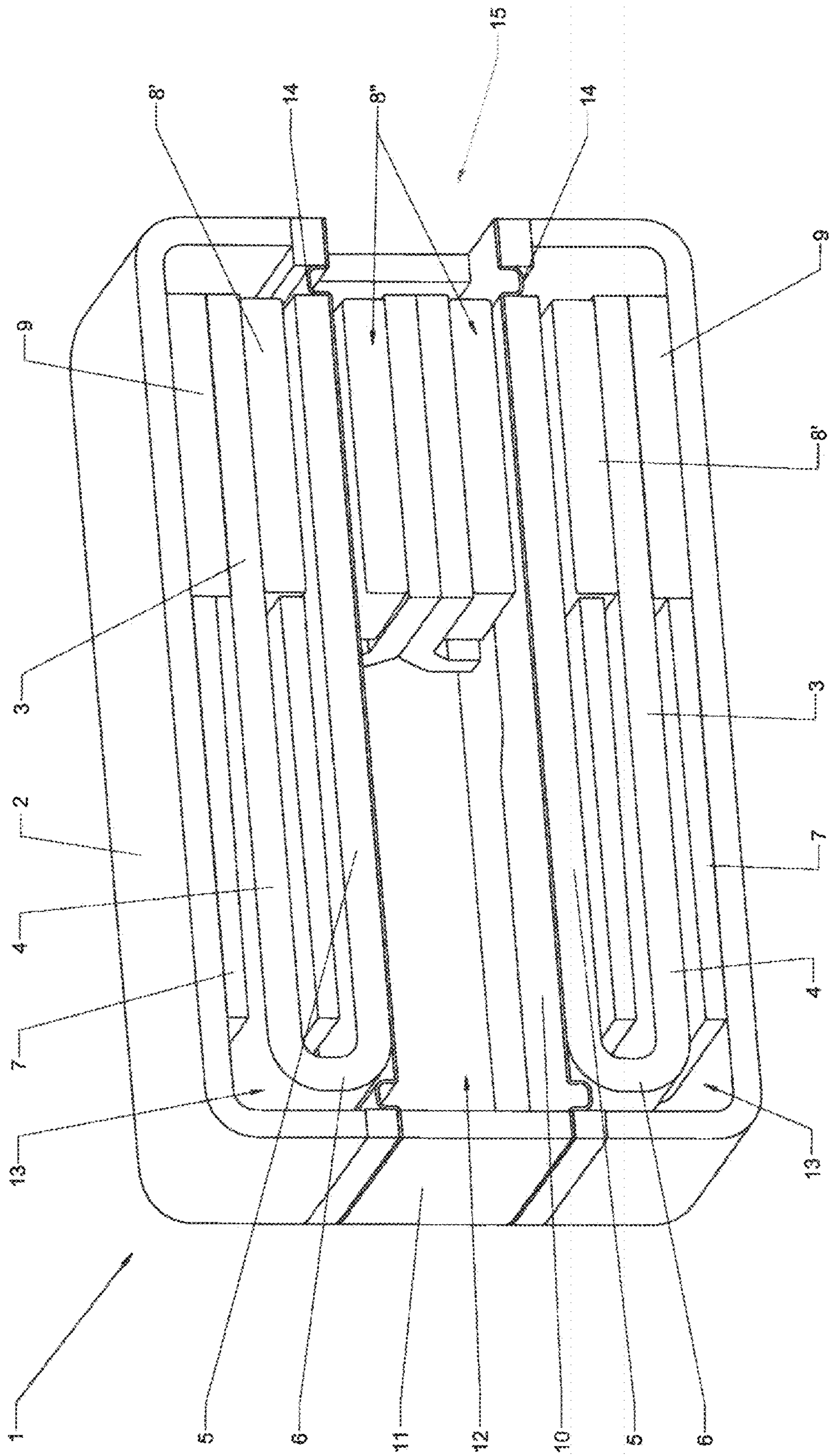
FIG. 4 shows a schematic perspective cross section of the transducer according to a fourth embodiment of the invention.

FIG. 4 shows the transducer 1 according to a fourth embodiment of the invention. Only the differences from the second embodiment will be explained here. For a further description of the transducer 1 of FIG. 4 the reader is referred to the description relating to FIG. 2.

The transducer 1 of FIG. 4 is also a dual design but differs from the second embodiment in that the configuration of the two moveable elements 3 is different. In this fourth embodiment the first legs 4 are the outer legs of the moveable elements 3 as seen with respect to the other moveable element 3. The two seals 10 are in this embodiment attached to the inner surfaces of the respective second legs 5, inner being defined with respect to the other moveable element 3, such that the seals 10 are attached to the surfaces of the second legs 5 that are facing each other. The housing 2 is again divided in three chambers, but in this embodiment, there are two back chambers 13 and one front chamber 12. The back chambers 13 accommodate a respective moveable element 3, coil 7 and magnet 8' and are the outer chambers. The front chamber 12 comprises the other magnets 8", connects to the sound outlet opening 15 and is the middle chamber.

Although the invention has been discussed in the foregoing with reference to an exemplary embodiment of the system of the invention, the invention is not restricted to this particular embodiment which can be varied in many ways without departing from the invention. The discussed exemplary embodiment shall therefore not be used to construe the appended claims strictly in accordance therewith. On the contrary the embodiment is merely intended to explain the wording of the appended claims without intent to limit the claims to this exemplary embodiment. The scope of protection of the invention shall therefore be construed in accordance with the appended claims only, wherein a possible ambiguity in the wording of the claims shall be resolved using this exemplary embodiment.

The invention claimed is:

1. A transducer, comprising:

a housing, the housing at least partly accommodating at least one moveable element;

at least one drive means for moving the at least one moveable element, the at least one drive means including a coil and a magnet assembly; and at least one seal attached to an inner side of a circumferential wall of the housing to divide an inner volume of the housing into at least two chambers that are sealed off with respect to each other by means of the at least one seal, wherein the at least one moveable element is arranged for outputting acoustic energy without requiring a diaphragm, the at least one moveable element including a first leg and a second leg that are connected to each other, wherein the coil extends around the first leg such that the first leg is driven in a reciprocating movement by the at least one drive means and the second leg that is connected to the first leg is thereby also driven in the reciprocating movement, and wherein the at least one seal is attached to the second leg, and wherein the at least one seal is attached to a side of the second leg that is facing away from the first leg.

2. The transducer according to claim 1, wherein the at least one seal forms a circumferential edge, the at least one seal being attached to the inner side of the circumferential wall along the circumferential edge.

3. The transducer according to claim 1, wherein the at least one seal is attached to the second leg by gluing.

4. The transducer according to claim 1, wherein the at least one seal comprises a flexible and/or stretchable foil.

5. The transducer according to claim 1, wherein the at least one moveable element has a substantially U-shaped cross section and the first leg and the second leg are connected to each other by a base of the substantially U-shaped cross section.

6. The transducer according to claim 1, wherein the coil is completely arranged in a first chamber of the at least two chambers.

7. The transducer according to claim 1, wherein the magnet assembly comprises two magnets, the two magnets including a first magnet and a second magnet, wherein the first magnet is arranged in a first chamber of the at least two chambers and the second magnet is arranged in a second chamber of the at least two chambers.

8. The transducer according to claim 1, wherein the transducer comprises two moveable elements, the two moveable elements including the at least one moveable element, the two moveable elements each including a respective first leg and a respective second leg that are connected together, two drive means, the two drive means including the at least one drive means, the two drive means including separate, respective coils of a plurality of coils, and two seals, the two seals including the at least one seal, the two moveable elements are arranged substantially parallel to each other and respective first legs of the two moveable elements are neighbouring legs, the two seals are attached to respective second legs of the two moveable elements in such a manner that the housing is divided by the two seals in substantially three chambers, and the two moveable elements and the plurality of coils are arranged in a middle chamber of the substantially three chambers.

9. The transducer according to claim 1, wherein the transducer comprises two moveable elements, the two moveable elements including the at least one moveable element, the two moveable elements each including a respective first leg and a respective second leg that are connected together, two drive means, the two drive means including the at least one drive means, the two drive means including separate, respective coils of a plurality of coils, and two seals, the two seals including the at least one seal, the two moveable elements are arranged substantially parallel to each other and respective first legs of the two moveable elements are outer legs, the two seals are attached to respective second legs of the two moveable elements in such a manner that the housing is divided by the two seals in substantially three chambers, and the two moveable elements and the plurality of coils are arranged in a respective outer chamber of the substantially three chambers.

10. The transducer according to claim 1, wherein the at least one moveable element is an armature.

11. The transducer according to claim 1, wherein the at least one seal is attached to the inner side of the circumferential wall of the housing by means of a frame.

12. A portable audio device, the portable audio device comprising the transducer according to claim 1.

13. The portable audio device according to claim 12, wherein the portable audio device includes a headphone, or an in-ear device, the in-ear device including at least one of a hearing aid, a hearing device, a hearable, an earphone, or an earbud.

14. A transducer, comprising:

a housing, the housing at least partly accommodating at least one moveable element;

at least one drive means for moving the at least one moveable element;

the at least one drive means including a coil and a magnet assembly; and at least one seal attached to an inner side of a circumferential wall of the housing to divide an inner volume of the housing in at least two chambers that are sealed off with respect to each other by means of the at least one seal, wherein the at least one moveable element is arranged for outputting acoustic energy without requiring a diaphragm, the at least one moveable element including a first leg and a second leg that are connected to each other, wherein the coil extends around the first leg such that the first leg is driven in a reciprocating movement by the at least one drive means and the second leg that is connected to the first leg is thereby also driven in the reciprocating movement, and wherein the at least one seal is attached to the second leg, and wherein the magnet assembly comprises two magnets, the two magnets including a first magnet and a second magnet, wherein the first magnet is arranged in a first chamber of the at least two chambers and the second magnet is arranged in a second chamber of the at least two chambers.

15. The transducer according to claim 14, wherein the at least one seal forms a circumferential edge, the at least one seal being attached to the inner side of the circumferential wall along the circumferential edge.

16. The transducer according to claim 14, wherein the at least one moveable element has a substantially U-shaped cross section and the first leg and the second leg are connected to each other by a base of the substantially U-shaped cross section.

17. A transducer, comprising:

a housing, the housing at least partly accommodating at least one moveable element;

at least one drive means for moving the at least one moveable element;

the at least one drive means including a coil and a magnet assembly; and at least one seal attached to an inner side of a circumferential wall of the housing to divide an inner volume of the housing in at least two chambers that are sealed off with respect to each other by means of the at least one seal, wherein the at least one moveable element is arranged for outputting acoustic energy without requiring a diaphragm, the at least one moveable element including a first leg and a second leg that are connected to each other, wherein the coil extends around the first leg such that the first leg is driven in a reciprocating movement by the at least one drive means and the second leg that is connected to the first leg is thereby also driven in the reciprocating movement, and wherein the at least one seal is attached to the second leg, and wherein the at least one seal is attached to the inner side of the circumferential wall of the housing by means of a frame.

18. The transducer according to claim 17, wherein the at least one seal forms a circumferential edge, the at least one seal being attached to the inner side of the circumferential wall along the circumferential edge.

19. The transducer according to claim 17, wherein the at least one moveable element has a substantially U-shaped cross section and the first leg and the second leg are connected to each other by a base of the substantially U-shaped cross section.

* * * * *